UNITED STATES PATENT OFFICE.

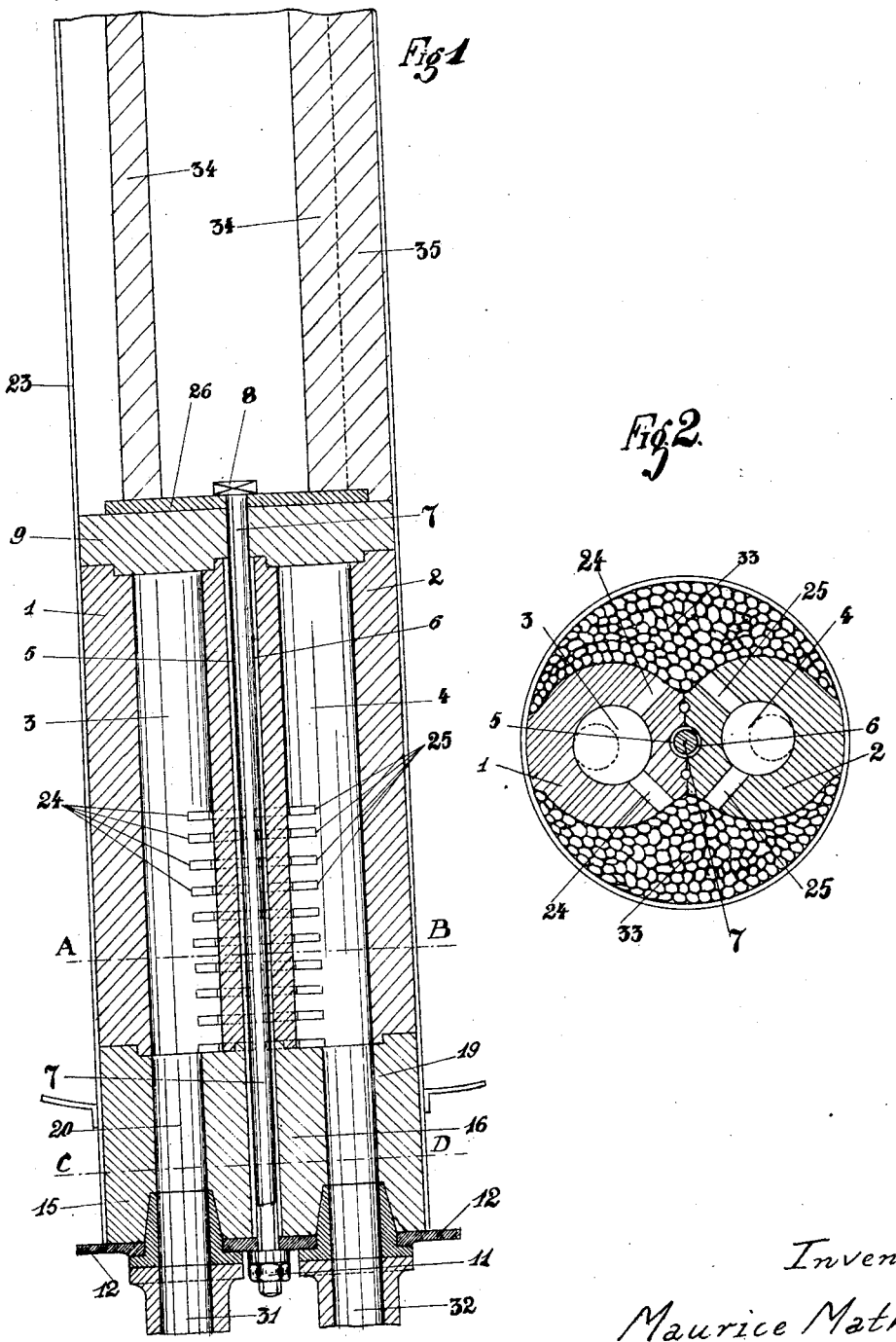

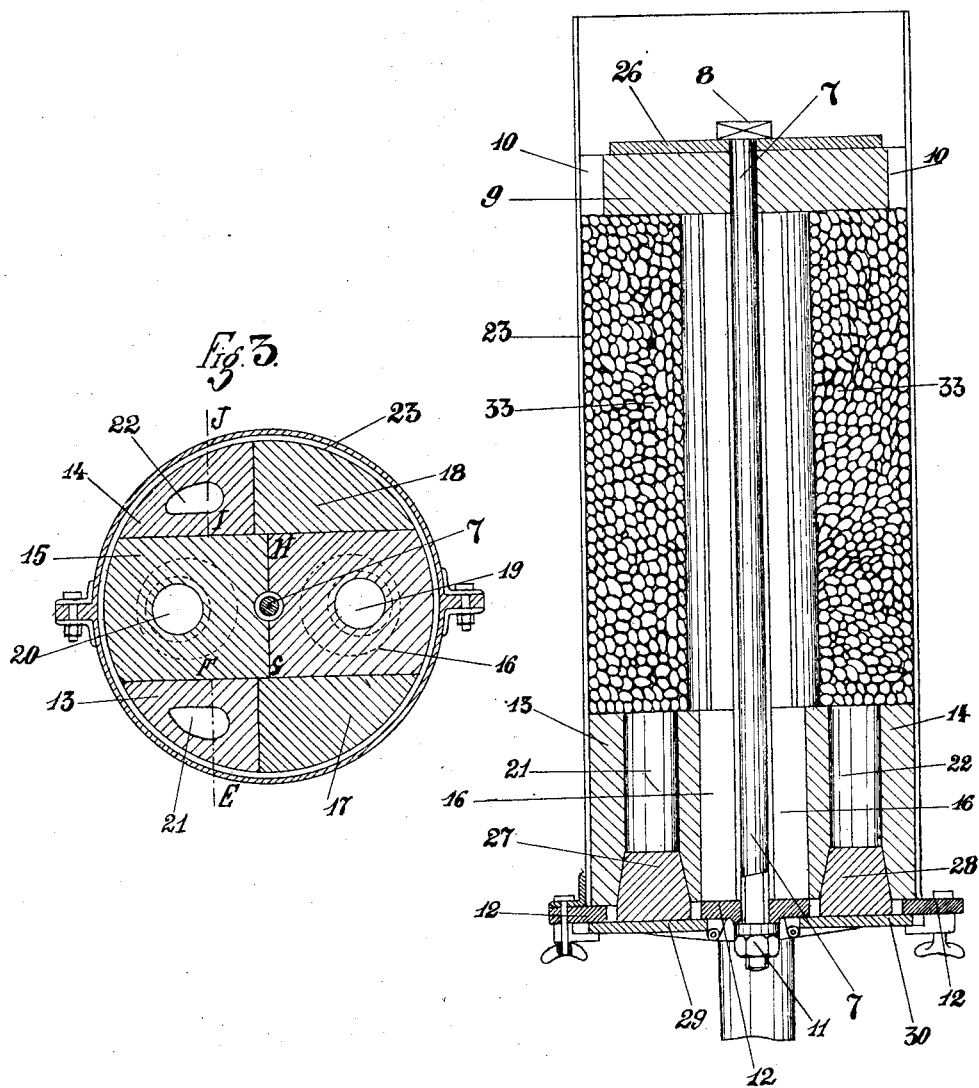

MAURICE MATHY, OF LIÈGE, BELGIUM.

SURFACE-COMBUSTION GAS-BURNER.

1,388,357.      Specification of Letters Patent.     Patented Aug. 23, 1921.

Application filed September 21, 1920. Serial No. 411,790.

*To all whom it may concern:*

Be it known that I, MAURICE MATHY, manufacturer, a subject of the King of Belgium, and resident of Liège, in the Kingdom of Belgium, have invented certain new and useful Improvements in and Relating to Surface-Combustion Gas-Burners; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

This invention relates to an improved gas burner for a boiler tube in which the combustion of a gaseous mixture is produced without flame in the midst of a mass of granules of porous and refractory material.

In the burner according to the present invention the pipes for admitting gas and air are arranged parallel with the axis of the tube carrying the mass of granules, and are provided with openings giving passage to the gas or the air which substances meet in the porous and refractory granules and are there intimately mixed and burnt flamelessly.

It is evident that the mass of porous and refractory granules may extend beyond the last apertures or ports for admitting air and gas.

In a particular form of construction of the invention, subsequent to the mass of porous and refractory granules, a cylinder of refractory material is arranged in the tube and its surface being provided with corrugations or ribs bearing against the inner walls of the tube and arranged so that the hot gases of combustion circulate in the space comprised between the said cylinder and the inner walls of the tube.

The invention is more particularly described with reference to the accompanying drawings in which:—

Figure 1 is a partial sectional elevation of the burner,

Fig. 2 a transverse section on the line A—B of Fig. 1.

Fig. 3 is a transverse section on the line C—D of Fig. 1.

Fig. 4 is a section on the line E—F—G—H—I—J of Fig. 3.

At the front end of the tube 23 the burner is placed and two blocks 1 and 2 of refractory material are arranged longitudinally in the tube 23 and are connected and form a diametrical partition in the tube. On both sides of these two blocks granules 33 of porous and refractory material are arranged. The block 1 is perforated with an air admission pipe 3 communicating with the mass of granules by apertures 24 opening at each side of this block. The block 2 is perforated with a pipe 4 for introducing gas communicating with the mass of granules by apertures 25 connecting on each side of this block. The passages 24 and 25 on each side of the central partition are directed one toward the other so that the air and the gas meet in the mass of granules itself.

The blocks 1 and 2 are each provided on their faces, which come in contact with one another, with a groove, these grooves are respectively indicated by 5 and 6. They form a pipe when the blocks are assembled. This pipe is traversed by a rod 7 provided at its end which is directed toward the interior of the tube with a head 8 supported upon a metal plate 26 bearing against a circular slab 9 of refractory material. This slab 9 forms the partition which limits the burner toward the interior of the tube. The end of the rod 7 directed toward the exterior of the tube is threaded so that a nut 11 can be screwed on it and bears on a metal plate 12 which closes the tube. The object of this nut 11 is to grip between the metal plates 12 and 26, the slab 9, the blocks 1 and 2 aforesaid and the blocks 13, 14, 15, 16, 17 and 18 of refractory material arranged at the front of the tube against the said metal plate 12.

These blocks are shown in transverse section in Fig. 3. The blocks 15 and 16 are arranged in a prolongation of the blocks 1 and 2 and are perforated with passages 20 and 19 serving respectively for the passage of the air and gas. The tube 23 is closed on each side of the block 16 by blocks 17 and 18 and on each side of the block 15 by blocks 13 and 14. The blocks 13 and 14 are perforated with apertures 21 and 22 through which, is effected the insertion of the granules and the lighting of the gaseous mixture. These apertures 21 and 22 are closed by plugs 27 and 28 held in place by doors 29 and 30 pivoted on the said metal plate 12.

The air and the gas are respectively brought into the pipes 20 and 19 by pipes 31 and 32 (Fig. 1).

The gas having been burnt in the midst of the porous and refractory granules 33 escapes from the burner by holes 10 bored in the slab 9.

A cylinder 34 of refractory material, the surface of which is provided with longitudinal ribs such as 35 is arranged in the tube 23 in succession to the burner as shown in Fig. 1, and these ribs rest on the inner walls of the tube 23. The gases of combustion coming from the burner circulate in the space comprised between this cylinder 34 and the inner walls of the tube 23. On emerging from the tube 23 they are directed toward a chimney.

What I claim is:

1. A burner for boilers having tubular furnaces heated by the incandescent combustion of a gaseous mixture, comprising a pipe for the admission of air and a pipe for the admission of gas arranged parallel with one another in the furnace tube, apertures provided over part of the length of said pipes, and a mass of porous and refractory granules arranged in the tube around said pipes, so that the gas and air meet among the granules and become intimately mixed and then burnt flamelessly in the mass of granules situated around the imperforate part of the air and gas supply pipes.

2. A burner for boilers having tubular furnaces heated by the incandescent combustion of a gaseous mixture, comprising a pipe for the admission of air and a pipe for the admission of gas arranged parallel with one another in the furnace tube, apertures provided over part of the length of said pipes, a mass of porous and refractory granules arranged in the tube around said pipes, so that the gas and air meet among the granules and become intimately mixed and then burnt flamelessly in the mass of granules situated around the imperforate part of the air and gas supply pipes, a cylinder of refractory material arranged in succession to the mass of granules, and longitudinal ribs on the external surface of said cylinder bearing against the inner walls of the tube.

3. A burner for boilers having tubular furnaces heated by the incandescent combustion of a gaseous mixture, comprising two end plates arranged in the furnace tube the inner one being perforated, a central partition dividing longitudinally into two parts the space between said end plates and formed of two blocks of refractory material, a pipe for the admission of air and a pipe for the admission of gas bored parallel to one another in said blocks, a mass of porous and refractory granules arranged in the space around the blocks, apertures provided over part of the length of said blocks for communicating said air and gas admission pipes with the mass of the granules, a longitudinal passage formed by the blocks, and a tension rod connecting the two end plates through said passage.

4. A burner for boilers having tubular furnaces heated by the incandescent combustion of a gaseous mixture comprising two end plates arranged in the furnace tube the inner one being perforated, a central partition dividing longitudinally into two parts the space between said end plates and formed of two blocks of refractory material, a pipe for the admission of air and a pipe for the admission of gas bored parallel to one another in said blocks, a cylinder of refractory material arranged between the outer end plate and the central partition, a gas admitting passage and an air admitting passage provided in said cylinder and corresponding respectively with the gas and air admitting pipes in the central partition, supplementary longitudinal apertures in said cylinder, a mass of porous and refractory granules arranged in the space around the blocks, apertures provided over part of the length of said blocks for communicating said air and gas admission pipes with the mass of the granules, a longitudinal passage formed by the blocks, and a tension rod connecting the two end plates through said passage.

In testimony whereof I affix my signature in presence of two witnesses.

MAURICE MATHY.

Witnesses:
J. WEATHCLEF,
CH. MERCHIE.